M. H. VAN H. BATTENBERG.
SEAL LOCK.
APPLICATION FILED OCT. 19, 1911.
1,233,440. Patented July 17, 1917.
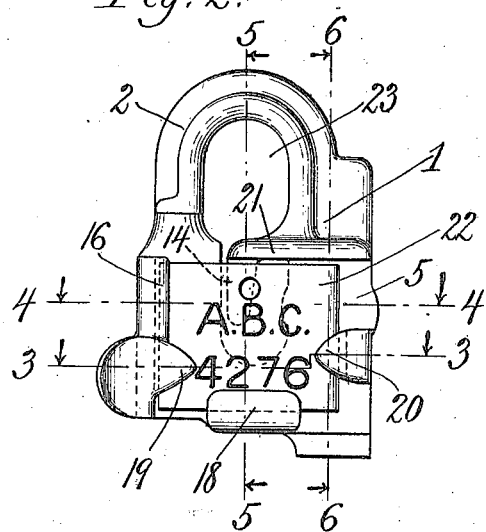
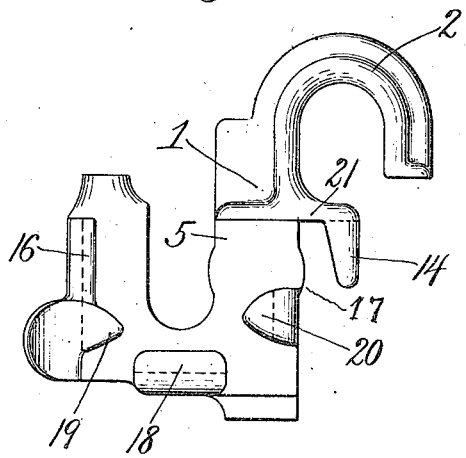
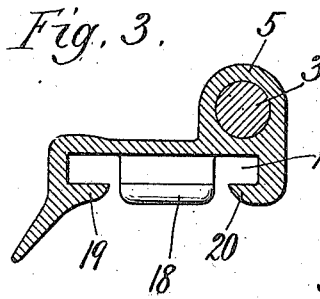
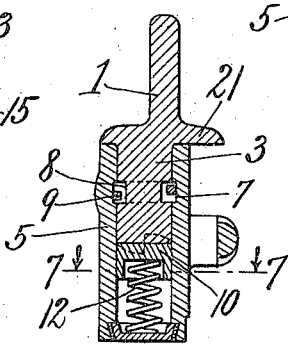
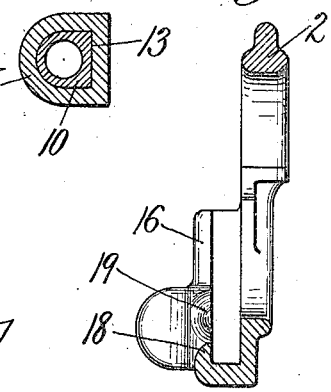
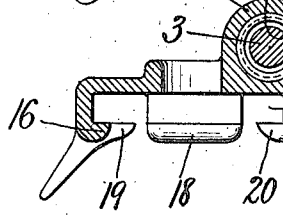
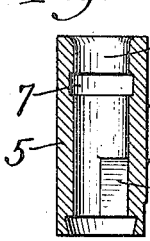
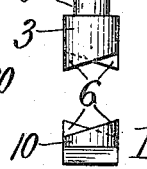
Witnesses.
Edward T. Wray.
Minnie M. Lindman.
Inventor.
Melvin H. Van H. Battenberg
by Parker & Carter
Attorneys.

UNITED STATES PATENT OFFICE.

MELVIN H. VAN H. BATTENBERG, OF CHICAGO, ILLINOIS, ASSIGNOR OF TWO-THIRDS TO LAWRENCE C. WEYAND, OF CHICAGO, ILLINOIS, AND ONE-THIRD TO BATTENBERG CAR SEAL AND EQUIPMENT CO., A CORPORATION OF ILLINOIS.

SEAL-LOCK.

1,233,440.      Specification of Letters Patent.      Patented July 17, 1917.

Application filed October 19, 1911. Serial No. 655,509.

*To all whom it may concern:*

Be it known that I, MELVIN H. VAN H. BATTENBERG, a citizen of the United States, residing at Chicago, in the county of Cook and State of Illinois, have invented a certain new and useful Improvement in Seal-Locks, of which the following is a specification.

This invention relates to seal locks and has for its object to provide a new and improved lock of this description.

The invention is illustrated in the accompanying drawings, wherein

Figure 1 is a view of one form of lock embodying the invention;

Fig. 2 is a view showing the seal in place and the locking part closed;

Fig. 3 is a sectional view taken on line 3—3 of Fig. 2;

Fig. 4 is a sectional view taken on line 4—4 of Fig. 2;

Fig. 5 is a sectional view taken on line 5—5 of Fig. 2;

Fig. 6 is a sectional view taken on line 6—6 of Fig. 2;

Fig. 7 is a sectional view taken on line 7—7 of Fig. 6;

Fig. 8 is a view similar to Fig. 6 with the end of the locking part and associated parts removed;

Fig. 9 is a view showing the end of the locking part;

Fig. 10 is a view showing the coöperating part therefor;

Fig. 11 is a view of the fastening device for the locking part.

Like numerals refer to like parts throughout the several figures.

For purposes of illustration I have shown the lock in the form of a padlock, but it is, of course, evident that it may be made up in any other desired form. I have also shown the lock as used in connection with a frangible seal adapted for railway cars.

Referring now to the drawings, I have shown a lock for a locking part 1 with a shackle 2, said locking part provided with a shank 3 which extends into an opening 4 in the body portion 5 of the lock. The shackle 2 is arranged so that it may be rotated continuously in one direction but fastened against rotation in the opposite direction. As herein shown this result is secured as follows: The shank 3 of the locking part is provided with the projections 6, which may be arranged in the form of a ratchet. This shank 3 is free to rotate in the body portion 5 but is limited so that it cannot move longitudinally to be withdrawn therefrom. Any desired means for securing this result may be used. As herein shown the body portion 5 is provided with a groove 7 and the shank 3 of the locking part is provided with a groove 8. A spring open end ring 9 is placed in the groove 8 and is compressed by a pair of pliers or in any other manner and the end 3 thrust into the opening 8. When the part 9 reaches the groove 7, it springs out into said groove as shown in Fig. 6, thus preventing the withdrawal of the locking part. Located in the hollow space or opening 4 is a coöperating fastening part 10, which is provided with teeth 11 similar to teeth 6. The part 10 is arranged so that it cannot be rotated but can be moved longitudinally and is held against the end of the part 3 by a suitable spring 12. The end of the opening 4 is sealed up in any desired manner. The part 10 is prevented from rotating by any means such as a projection which fits into a groove 13 in the body portion 5, thus permitting the part 10 to slide up and down, but preventing it from rotating. The locking part 1 is provided with a seal breaking part 14 (see Figs. 1 and 2). The body portion of the lock is provided with a seal receiving space 15 for receiving the frangible seal 22, which may be formed in any desired manner as by means of the projecting pieces 16, 17 and 18. To insure the ordinary breaking of the frangible seal, the projecting pieces 16 and 17 are provided with the breaking points 19 and 20. Said body portion is preferably provided with a slot intermediate the parts 19 and 20 through which the breaking part 14 passes during the breaking movement. The locking part 1 is provided with a closing part 21 (see Fig. 6), which passes over the upper end of the seal receiving space 15 when the locking part is in its locking position so as to prevent the removal of the seal.

I have described the parts in detail for the purposes of illustration, but it is, of course, evident that the parts may be varied in many particulars without departing from the spirit of my invention.

The use and operation of my invention is as follows:

When it is desired to use the lock, the locking part is rotated to the position shown in Fig. 1 and the frangible seal 22 is placed in the slot 15. The locking part is then rotated to the position shown in Fig. 1, the part to be locked then passing through the space 23. When the parts are in this position, the seal cannot be removed because of the projections 16, 17, 18 and 21 and is thus locked in the seal receiving space. The bolt cannot be rotated backwardly because of the engaging teeth 6 and 11 and is held from rotating forwardly only by the frangible seal 22.

It will thus be seen that the lock cannot be unlocked except by breaking the frangible seal and hence any unlocking thereof by unauthorized persons will be indicated by this fact and show that the device has been tampered with by unauthorized persons.

When it is desired to unlock the device, the locking part 1 is rotated forwardly. The seal breaking part 14 then engages the frangible seal and since the seal is held against movement by the parts of the body portion of the lock, it will be seen that the seal will be broken by the seal breaking part and since the seal inclosing space is comparatively open, the pieces will fall out and permit the forward rotation of the lock. It will thus be seen that I have provided here a seal lock very simple in construction and very easy to operate. It will further be seen that there are no parts of the lock except those which are permanently fastened together and that nothing need be done either to lock or unlock the device except to rotate the locking part only.

I claim:

A seal lock comprising a U-shaped body portion, a seal receiving space for a frangible seal extending across from one branch of the U-shaped body portion to the other so that said branches engage the seal, at separated points when the seal is in position, the middle portion of the seal being free, a rotatable locking part connected with said body portion, a seal breaking part connected with said rotatable locking part and adapted to pass between the branches of the U-shaped body portion when rotated, so as to strike the seal and break it.

Signed at Chicago, Illinois, this 9th day of October, 1911.

MELVIN H. VAN H. BATTENBERG.

Witnesses:
MINNIE M. LINDENAU,
GENEVA HIRTH.

Copies of this patent may be obtained for five cents each, by addressing the "Commissioner of Patents, Washington, D. C."